United States Patent [19]

Shepherd

[11] 4,261,251

[45] Apr. 14, 1981

[54] KELLY HEAD FOR HYDRAULIC MAST DIGGER

[75] Inventor: William L. Shepherd, West University, Tex.

[73] Assignee: Hughes Tool Company, Houston, Tex.

[21] Appl. No.: 81,999

[22] Filed: Oct. 4, 1979

[51] Int. Cl.³ .............................. F16J 1/10; F16J 9/00
[52] U.S. Cl. ....................................... 92/116; 92/250; 92/258; 173/150
[58] Field of Search ........................ 92/116, 258, 257; 64/23.5; 173/150

[56] References Cited

U.S. PATENT DOCUMENTS

| Re. 21,677 | 12/1940 | Tremolada | 92/116 |
|---|---|---|---|
| 2,598,271 | 5/1952 | Klosterman | 92/116 |
| 2,634,950 | 4/1953 | Allen | 92/116 |
| 2,803,842 | 8/1957 | Fuller | 173/150 |
| 3,525,404 | 8/1970 | Newmon et al. | 173/150 |

Primary Examiner—Paul E. Maslousky
Attorney, Agent, or Firm—Robert A. Felsman

[57] ABSTRACT

A hydraulic mast digger has a kelly head with improved retaining and sealing features. The digger is of the type having a kelly with a bearing assembly mounted between the kelly and a bearing sleeve. The bearing sleeve is reciprocally carried in the hydraulic cylinder and moves in response to hydraulic fluid pressure. The bearing assembly allows rotation of the kelly with respect to the bearing sleeve. A cap is secured by threads to the bearing sleeve above the top of the kelly to define a piston. The cap has an upwardly facing shoulder located below the upper edge of the bearing sleeve. A retainer is rigidly secured to the cap and extends down into the space between the cap and bearing sleeve. A locking device locks the retainer to the bearing sleeve. Preferably the locking device includes a key that fits within slots formed on the retainer and bearing sleeve. A primary seal encircles the retainer.

6 Claims, 2 Drawing Figures

KELLY HEAD FOR HYDRAULIC MAST DIGGER

BACKGROUND OF THE INVENTION

1. Field of the Invention:

This invention relates in general to earth boring machines and in particular to an improved kelly head for a hydraulic mast digger.

2. Description of the Prior Art:

Shallow holes for foundation piers and the like are often drilled with a hydraulically powered drilling machine known as a digger. The digger is usually truck mounted and has a hydraulic mast or cylinder twenty to thirty feet long. A square bar known as a kelly is rotatably carried in the hydraulic cylinder and rotatably driven by a hydraulic motor. The kelly has a kelly head at its top that serves as a piston for moving the kelly up and down in response to hydraulic fluid pressure in the hydraulic cylinder. The cutting tool secured to the bottom of the kelly is normally an auger containing helical flights.

The kelly head includes a set of bearings secured to the top of the kelly and mounted in a bearing sleeve. The bearing sleeve moves longitudinally in the hydraulic cylinder, and the bearings allow the kelly to rotate with respect to the bearing sleeve. A cap, also called a spindle, is secured to the top of the sleeve. The cap and bearing sleeve form a piston for movement in the cylinder in response to the hydraulic fluid pressure.

In one prior art model, the cap is secured to the bearing sleeve by screws that may loosen and cause damage. In another prior art model, the cap is secured by threads to the bearing sleeve. A pin is driven into a blind hole formed between the cap and bearing sleeve to prevent the cap from loosening. The disadvantage of this arrangement is that when access to the bearings is required, the pin must be drilled out. This is time consuming and may cause damage to the cap. In addition to providing an improved connection between the cap and bearing sleeve, increasing the life of the seals of the kelly head is also desirable.

SUMMARY OF THE INVENTION

It is accordingly the general object of this invention to provide an improved kelly head for a hydraulic mast digger.

It is a further object of this invention to provide a kelly head for a hydraulic mast digger with improved means for securing the cap to the bearing sleeve.

It is a further object of this invention to provide a kelly head for a hydraulic mast digger with improved means for securing the cap to the bearing sleeve and with improved seals.

In accordance with these objects, a kelly head is provided in which the cap is secured by threads inside the bore of the bearing sleeve. To prevent loosening, the cap has an upwardly facing shoulder located within the bore of the bearing sleeve, defining a space between the cap and bearing sleeve. A retainer is rigidly connected to the cap and extends into this space. Locking means between the retainer and bearing sleeve prevent rotation of the bearing sleeve with respect to the retainer. Preferably the locking means includes a slot formed by flats on the retainer and bearing sleeve, and a key adapted for insertion into the slot. A primary seal encircles the retainer to provide sealing.

DESCRIPTION OF THE PREFERRED EMBODIMENT

Figure 1:
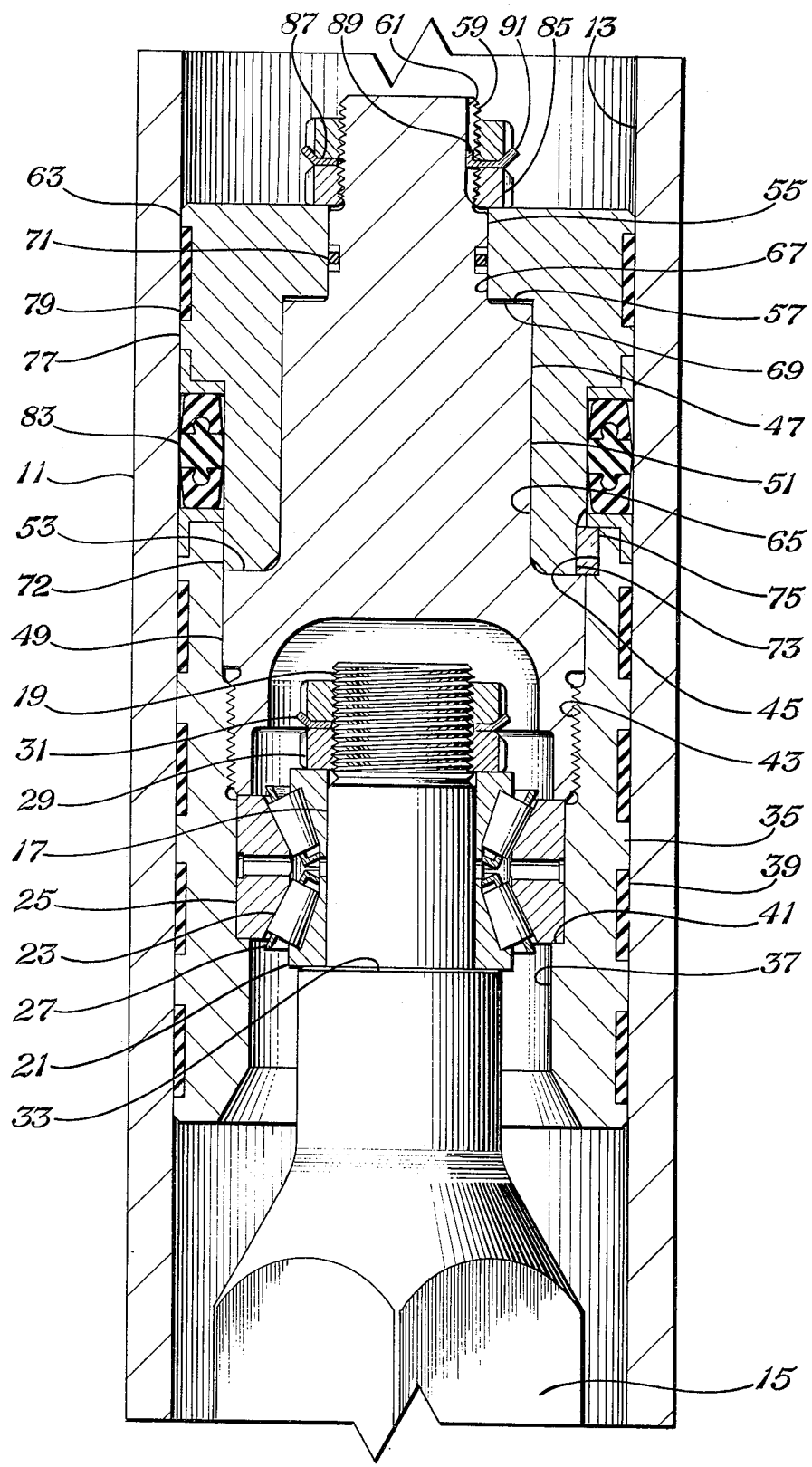
FIG. 1 is a vertical sectional view of a kelly head constructed in accordance with this invention.

Referring to FIG. 1, a hydraulic cylinder or mast 11 is normally mounted to a truck (not shown) and is twenty to thirty feet in length. Mast 11 has a cylindrical inner bore 13 extending its length. A kelly 15 is carried inside bore 13 of mast 11. Kelly 15 is a square bar or tube slightly longer in length than mast 11. A hydraulic motor (not shown) located near the bottom of mast 11 rotatably drives the kelly 15. A cylindrical shaft 17 is integrally formed on the top of kelly 15 and extends upwardly, terminating in a threaded section 19.

A bearing assembly is mounted on shaft 17. The bearing assembly includes two inner races 21 pressed over shaft 17. A plurality of tapered roller bearings 23 are mounted between inner race 21 and an outer race 25. A cage 27 retains each set of tapered roller bearings. A pair of nuts 29 in engagement with threads 19 secure inner race 21 to shaft 17. Lock washer 31, mounted between nuts 29, locks them to threads 19 in a known manner. Bearing inner race 21 bears against a shoulder 33 formed at the base of shaft 17.

A bearing sleeve 35 is reciprocally carried in inner bore 13 of mast 11. Bearing sleeve 35 is cylindrical, having an inner axial bore 37. A plurality of resilient wear rings 39 are located in grooves on the outer wall of bearing sleeve 35 for contact with bore 13 of mast 11. Bearing sleeve 35 has an internal upwardly facing shoulder 41 in inner bore 37. Bearing sleeve 35 has a set of internal threads 43 spaced above shoulder 41. Bore 37 is of slightly larger diameter above threads 43 than below. A short recessed segment, preferably a flat section 45, is formed in bore 37 at its upper edge. Bearing outer race 25 fits tightly within bore 37 below threads 43 and in contact with shoulder 41. Shoulder 41 prevents bearing sleeve 35 from moving upward with respect to the bearing assembly.

A cap or spindle 47 is mounted to the bearing sleeve 35 above the top of the kelly 15. Spindle 47 has a cylindrical lower portion 49 with outer threads that engage the threads 43 of the bearing sleeve 35. When fully made up, the lower edge of the spindle 47 bears against the top of the upper bearing outer race 25. This, along with shoulder 41, prevents any axial movement of bearing sleeve 35 with respect to the bearing assembly. Spindle 47 has an upwardly extending shaft 51 of lesser diameter than the lower portion 49, defining an upwardly facing shoulder 53. Shaft 51 has an upper cylindrical portion 55 of reduced diameter, defining another upwardly facing shoulder 57. Threads 59 are located at the upper end of the upper cylindrical portion 55. A vertical slot 61 is cut through the threads at one point. Shoulder 53 is below the upper edge of bearing sleeve 35, defining an annular space between shaft 51 and the bearing sleeve 35.

A retainer 63 is rigidly mounted to spindle 47 for preventing the threaded connection between the spindle 47 and the bearing sleeve 35 from loosening. Retainer 63 has an inner bore 65 that fits tightly on shaft 51. Inner bore 65 has a reduced diameter portion 67 at its top for tightly fitting over the shaft upper portion 55. Reduced portion 67 defines a downwardly facing shoulder 69 adjacent the shaft shoulder 57. An O-ring seal 71 is located between the shaft portion 55 and retainer bore portion 67.

Retainer 63 has a lower cylindrical portion 72 that fits tightly in the bore 37 at the upper end of bearing sleeve 35. The lower cylindrical portion 72 of the retainer 63 extends into the annular space between shaft 51 and bearing sleeve 35, and its edge bears against the spindle shoulder 53. The lengths of the retainer 63 and its bore 65 are selected so that a clearance will exist between the opposing shoulders 57 and 69, when fully made up.

A flat section 73 is formed in the outer wall of lower portion 72 at its lower edge. Flat 73 is of substantially the same dimension as the flat 45 on the inner upper edge of the bearing sleeve 35. Retainer 63 can be rotated so that the flats 73 and 45 are adjacent each other for defining a slot or space. A rectangular key 75, about one inch in length, is adapted to fit in the slot to serve as locking means for preventing the bearing sleeve 35 from rotating with respect to the retainer 63.

Retainer 63 has an upper cylindrical portion 77 adapted for sliding engagement with the mast bore 13. A wear ring 79 is located in a groove in the upper portion 77. A relatively large primary seal ring 83 encircles the retainer 63 around the lower portion 72.

The upper edge of seal 83 contacts the shoulder between the portions 72 and 77. The lower edge of seal 83 contacts the upper edge of bearing sleeve 35. A pair of nuts 85 engage the spindle shaft threads 59 for tightly securing the retainer 63 to the spindle 47. A lock washer 87 has an inner tab 89 that engages the vertical slot 61 to prevent the lock washer from rotating with respect to the spindle 47. The lock washer 87 is located between the nuts 85 and has outer tabs 91 that are bent upwardly and downwardly after tightening, to prevent one nut 85 from rotating with respect to the other nut 85.

In the operation of the embodiment of FIG. 1, hydraulic fluid pressure is supplied above retainer 63 to force the kelly 15 downward as the hydraulic motor rotates the kelly. To raise the kelly, hydraulic fluid pressure is supplied below the bearing sleeve 35, acting against the bottom side of the spindle 47. The bearing assembly allows the kelly 15 to rotate with respect to the bearing sleeve 35 and mast 11. Seal 83 minimizes leakage of hydraulic fluid across the kelly head.

To assemble the kelly head, the bearing sleeve 35 is placed around the kelly shaft 17. The bearing assembly is mounted to the shaft 17 and secured by nuts 29. Then, spindle 47 is screwed into bearing sleeve 35 with threads 43. Key 75 is placed against the bearing sleeve flat 45. Seal 83 is placed on retainer 63, and the retainer is placed over the spindle 47, with its flat 73 aligned with key 75. The lower nut 85 is tightened against the retainer 63. Lock washer 87 is placed over the lower nut 85, with its tab 89 in alignment with slot 61. Then the upper nut 85 is tightened against the lock washer 87. The outer tabs 91 are then bent in opposite directions. The disassembly is accomplished quickly by reversing the above steps.

Figure 2:
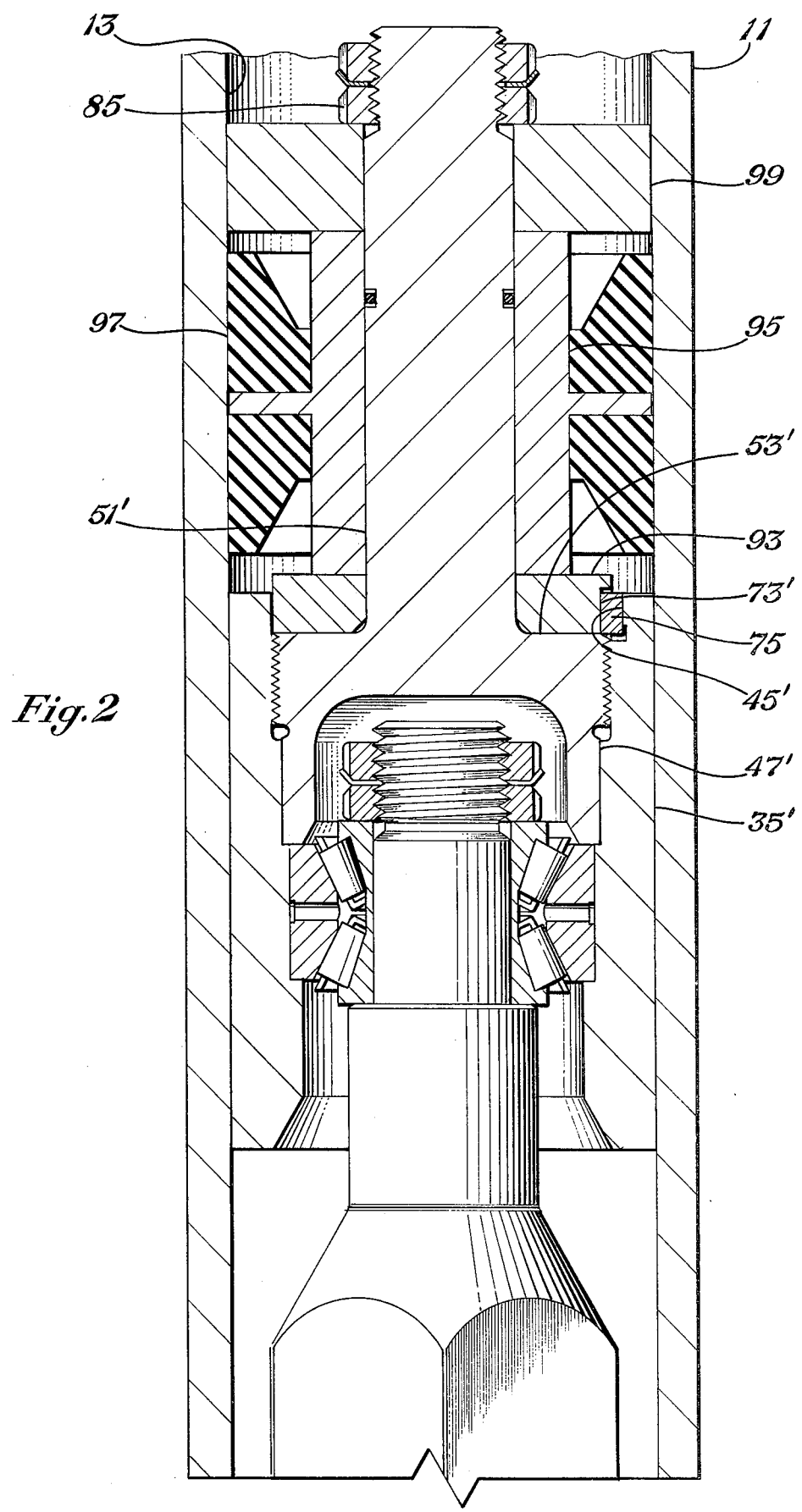
FIG. 2 is a vertical sectional view of an alternate embodiment of a kelly head constructed in accordance with this invention.

In the discussion of the embodiment of FIG. 2, components that are identical to those in FIG. 1 will either not be discussed and marked, or will be designated with the same number. All portions of components that differ slightly in configuration will be marked with the same number as in Fig. 1, but with a prime symbol. Completely new components will have new numbers. The bearing sleeve 35' is the same as bearing sleeve 35 except that it does not have grooves for receiving wear rings 39 (FIG. 1). The spindle 47' differs from the spindle 47 of FIG. 1 in that its shaft 51' is of uniform diameter. The upwardly facing shoulder 53' is larger in annular width than shoulder 53.

The retainer in FIG. 2 differs appreciably. The retainer includes a lock plate 93 that fits around shaft 51' and bears against shoulder 53'. Lock plate 93 contains a flat 73' that cooperates with the bearing sleeve flat 45' to receive key 75. The retainer in FIG. 2 also includes an inner core 95 of a large annular seal 97. Inner core 95 is a cylindrical sleeve that fits on a shaft 51'. Seal 97 is bonded to the outer wall of the inner core 95. The retainer of FIG. 2 also includes an upper portion that comprises an annular plate 99 located above inner core 95. Plate 99 fits tightly over shaft 51' and has an outer cylindrical wall in sliding contact with inner bore 13 of mast 11. Lock nuts 85 tightly secure the retainer portions 93, 95 and 99 to each other and to spindle 47'.

The FIG. 2 embodiment operates in the same manner as the embodiment of FIG. 1. It is assembled in the same manner, except that the retainer is comprised of three separate components, placed one after the other on the spindle.

It should be apparent that an invention having significant advantages has been provided. The retainer, along with the slot and key, provide a safe means for locking the cap to the bearing sleeve. The components are quickly assembled and disassembled, not requiring the drilling out of any pins. The large seals located around the retainer and above the bearing sleeve provide longer seal life than the kelly heads of the prior art.

While the invention has been shown in only two of its forms, it should be apparent to those skilled in the art that the invention is not so limited but is susceptible to various changes and modifications without departing from the spirit thereof.

I claim:

1. An earth boring machine of the type having a kelly with a bearing assembly mounted between the kelly and a bearing sleeve that is reciprocally carried in a hydraulic cylinder, the improvement comprising:
   a cap secured by threads to the bearing sleeve, the cap having an upwardly facing shoulder located below the upper edge of the bearing sleeve, defining a space between the cap and bearing sleeve;
   a retainer rigidly carried by the cap and extending into said space; and
   locking means in said space for locking the retainer to the bearing sleeve.

2. An improved kelly head for an earth boring machine of the type having a kelly with a bearing assembly mounted between the kelly and a bearing sleeve that is reciprocally carried in a hydraulic cylinder, the improvement comprising:
   a cap secured by threads to the bearing sleeve, the cap having an upwardly facing shoulder located below the upper edge of the bearing sleeve, defining a space between the cap and the bearing sleeve;
   A retainer rigidly carried by the cap and extending into said space; and
   a key inserted into a slot between the retainer and bearing sleeve to prevent the bearing sleeve from rotating with respect to the retainer.

3. An improved kelly head for an earth boring machine of the type having a kelly with a bearing assembly mounted between the kelly and a bearing sleeve that is reciprocally carried in a hydraulic cylinder, the improvement comprising:

a cap secured by external threads to internal threads in the bearing sleeve, the cap having an upwardly facing shoulder located below the upper edge of the bearing sleeve that is defined by an upwardly extending threaded shaft;

a retainer having a lower cylindrical portion urged tightly against the shoulder by a nut secured to the threads of the shaft, the retainer having a recessed segment adapted to mate with a recessed segment on the bearing sleeve to define a slot; and a key adapted for placement in the slot to prevent the bearing sleeve from rotating with respect to the retainer.

4. An improved kelly head for an earth boring machine of the type having a kelly with a bearing assembly mounted between the kelly and a bearing sleeve that is reciprocally carried in a hydraulic cylinder, the improvement comprising:

a cap secured by threads to the bearing sleeve, the cap having an upwardly facing shoulder located below the upper edge of the bearing sleeve;

a retainer rigidly carried by the cap with a lower portion in contact with the shoulder;

locking means for locking the retainer to the bearing sleeve; and a seal ring encircling the retainer in sliding engagement with the hydraulic cylinder.

5. An improved kelly head for an earth boring machine of the type having a kelly with a bearing assembly mounted between the kelly and a bearing sleeve that is reciprocally carried in a hydraulic cylinder, the improvement comprising:

a cap located above the top of the kelly and secured by threads to the inner wall of the bearing sleeve, the cap having an upwardly extending threaded shaft of reduced diameter that defines an upwardly facing annular shoulder located below the upper edge of the bearing sleeve;

a retainer having a cylindrical lower portion inserted below the upper edge of the bearing sleeve, and a cylindrical upper portion of diameter substantially that of the hydraulic cylinder, the lower portion having a recessed segment formed on its side wall adapted to mate with a recessed segment formed on the inner side wall of the bearing sleeve to define a slot;

the retainer being urged tightly against the shoulder by a nut secured to the threads on the shaft;

a key adapted for placement in the slot to prevent the bearing sleeve from rotating with respect to the retainer; and a seal ring encircling the retainer between the upper edge of the bearing sleeve and the upper portion of the retainer, for sealing engagement with the hydraulic cylinder wall.

6. A kelly head for mounting to the top of a kelly and for carriage in a hydraulic cylinder in an earth boring machine, comprising in combination:

a bearing assembly secured to the top of the kelly;

a cylindrical bearing sleeve carried reciprocally in the hydraulic cylinder, the bearing sleeve having an axial bore with an upwardly facing shoulder in contact with the lower edge of the bearing assembly;

a cap having a lower cylindrical portion secured to threads located in the bore of the bearing sleeve, the lower edge of the cap bearing against the bearing assembly to prevent axial movement of the bearing sleeve with respect to the bearing assembly, the cap having an upwardly extending shaft that defines an annular upwardly facing shoulder adapted to be within the bore of the bearing sleeve, the shaft having threads adjacent its top;

a retainer having a cylindrical lower portion extending into the bearing sleeve and bearing against the shoulder of the cap, the retainer being secured to the cap by a nut engaging the threads on the shaft, the lower portion of the retainer having a recessed segment on its outer wall adapted to mate with a recessed segment formed in the bore of the bearing sleeve at the top, defining a slot, the retainer having a cylindrical upper portion of diameter substantially that of the hydraulic cylinder for sliding engagement in the hydraulic cylinder;

a key adapted for placement in the slot to prevent the bearing sleeve from rotating with respect to the retainer; and a seal ring encircling the retainer between the upper edge of the bearing sleeve and the upper portion of the retainer, for sealing engagement with the hydraulic cylinder wall.

* * * * *